United States Patent
Szilassy et al.

(10) Patent No.: US 12,522,081 B2
(45) Date of Patent: Jan. 13, 2026

(54) METHOD AND CONTROL DEVICE FOR CONTROLLING REGENERATIVE BRAKING IN A VEHICLE

(71) Applicant: Scania CV AB, Södertälje (SE)

(72) Inventors: Andreas Szilassy, Stockholm (SE); Martin Berglund, Vagnhärad (SE); Magnus Carlgren, Vagnhärad (SE); Daniel Ståhl, Enköping (SE); Alexander Stamp, Huddinge (SE)

(73) Assignee: Scania CV AB, Södertälje (SE)

( * ) Notice: Subject to any disclaimer, the term of this patent is extended or adjusted under 35 U.S.C. 154(b) by 88 days.

(21) Appl. No.: 18/275,185

(22) PCT Filed: Feb. 10, 2022

(86) PCT No.: PCT/SE2022/050142
§ 371 (c)(1),
(2) Date: Jul. 31, 2023

(87) PCT Pub. No.: WO2022/177491
PCT Pub. Date: Aug. 25, 2022

(65) Prior Publication Data
US 2024/0109426 A1 Apr. 4, 2024

(30) Foreign Application Priority Data
Feb. 18, 2021 (SE) .................... 2150176-2

(51) Int. Cl.
*B60L 7/26* (2006.01)
(52) U.S. Cl.
CPC ............ *B60L 7/26* (2013.01); *B60L 2240/12* (2013.01); *B60L 2240/547* (2013.01)
(58) Field of Classification Search
CPC .. B60L 7/26; B60L 2240/12; B60L 2240/547; B60L 3/0076; B60L 15/2009;
(Continued)

(56) References Cited

U.S. PATENT DOCUMENTS 5,318,355 A * 6/1994 Asanuma ............ B60T 8/4081
477/203
8,918,240 B2 12/2014 Manickaraj et al.
(Continued)

FOREIGN PATENT DOCUMENTS

CN 102343823 A 2/2012
CN 105263777 A 1/2016
(Continued)

OTHER PUBLICATIONS

Mar. 8, 2022—(WO) International Search Report & Written Opinion—App. No. PCT/SE2022/050142.
(Continued)

*Primary Examiner* — Lindsay M Low
*Assistant Examiner* — Ruben Picon-Feliciano
(74) *Attorney, Agent, or Firm* — Banner & Witcoff, Ltd.

(57) ABSTRACT

A control device and a method for controlling a vehicle is provided. The vehicle comprises an energy storage device, an electric motor, and at least one service brake configured to brake a vehicle wheel. The method comprises, in case it is predicted that the energy storage device will have an insufficient capacity for a desired regenerative braking power during an upcoming braking event, applying a braking force by activating the service brake. The service brake is activated either simultaneously with application of a propulsion force by the electric motor, or in a plurality of consecutive brake phases during which a propulsion by the electric motor is temporarily interrupted, the brake phases separated by a vehicle acceleration phase during which a propulsion force is applied by the electric motor.

12 Claims, 4 Drawing Sheets

(58) Field of Classification Search
CPC . B60L 58/15; B60L 15/20; B60K 2006/4825; B60K 6/48; B60W 2300/12; B60W 2510/244; B60W 2552/20; B60W 2556/50; B60W 10/08; B60W 10/184; B60W 10/26; B60W 20/13; B60W 30/18109; B60W 30/18127; B60W 50/0097; B60W 20/14

See application file for complete search history.

(56) References Cited

U.S. PATENT DOCUMENTS

| | | | |
|---|---|---|---|
| 10,137,881 | B2 | 11/2018 | Choi |
| 2012/0160580 | A1 | 6/2012 | Nakata |
| 2015/0202966 | A1* | 7/2015 | Oyama ............... B60L 3/0046 701/22 |
| 2015/0298680 | A1 | 10/2015 | Matthews |
| 2015/0375751 | A1* | 12/2015 | Björkman ............ B60W 40/09 701/22 |
| 2016/0243947 | A1 | 8/2016 | Perkins et al. |
| 2016/0244044 | A1 | 8/2016 | Miller et al. |
| 2018/0141462 | A1 | 5/2018 | Kim et al. |
| 2018/0162359 | A1 | 6/2018 | Perkins |
| 2018/0304944 | A1 | 10/2018 | Wright |
| 2018/0354495 | A1* | 12/2018 | Kumazaki ............ B60W 10/115 |
| 2019/0337391 | A1* | 11/2019 | Crombez ........ B60W 30/18127 |
| 2020/0122728 | A1* | 4/2020 | Murase ................. B60L 7/18 |

FOREIGN PATENT DOCUMENTS

| | | |
|---|---|---|
| CN | 105905100 A | 8/2016 |
| CN | 107949512 A | 4/2018 |
| CN | 108437849 A | 8/2018 |
| EP | 3015333 A1 | 5/2016 |
| EP | 3124303 A2 | 2/2017 |
| EP | 3153365 A1 | 4/2017 |
| GB | 2483375 A | 3/2012 |
| WO | 2013167149 A1 | 11/2013 |

OTHER PUBLICATIONS

Feb. 1, 2019—(SE) Search Report—App. No. 2150176-2.
Sep. 9, 2021—(SE) Office Action—App. No. 2150176-2.
Sep. 22, 2022—(SE) Office Action—App. No. 2150176-2.
Dec. 20, 2024—(EP) Extended European Search Report—App. No. 22756638.7.
Jul. 9, 2025—(CN) First Office Action—App. No. 2022800085252.
Jul. 3, 20250—EP Examination Report—App. No. 22756638.7.

* cited by examiner

METHOD AND CONTROL DEVICE FOR CONTROLLING REGENERATIVE BRAKING IN A VEHICLE

CROSS-REFERENCE TO RELATED APPLICATIONS

The present application claims priority from and is a U.S. National Phase of International Application No. PCT/SE2022/050142, which was filed on Feb. 10, 2022, designating the United States of America and claiming priority to Swedish Patent Application No. 2150176-2, filed on Feb. 18, 2021. This application claims priority to and the benefit of the above-identified applications, which are all fully incorporated by reference herein in their entireties.

TECHNICAL FIELD

The present disclosure relates in general to a method for controlling a vehicle. The present disclosure further relates in general to a control device configured to control a vehicle. The present disclosure further relates in general to a computer program and a computer-readable medium. The present disclosure further relates in general to a vehicle.

BACKGROUND

Regenerative braking of a vehicle is an efficient tool for controlling the speed of a vehicle, such as a heavy land-based vehicle. It is also beneficial since it allows for recovery of energy which may later be used for the propulsion of the vehicle. More specifically, during regenerative braking, an electrical motor of the vehicle is operated as a generator whereby kinetic energy of the vehicle is converted into electrical energy used to charge an energy storage device of the vehicle. The recovered energy can later be used for propulsion of the vehicle by the electric motor being powered by the energy storage device.

The ability to use regenerative braking is however limited by the storage capacity of the energy storage device. The storage capacity is normally given by a predetermined maximum threshold value. During a braking event, the energy storage device may be charged to the predetermined maximum threshold value and cannot accept any additional energy without the risk of overcharging and damage of the energy storage device. Therefore, when the capacity of the energy storage device is at or above the predetermined maximum threshold value, regenerative braking cannot be used for controlling the speed of the vehicle during a braking event.

In case the capacity of the energy storage device, at the start of the regenerative braking event, is insufficient to provide the desired regenerative braking power for the braking event, other braking systems of the vehicle may have to be used during the braking event. Examples of such other braking system may include the service brakes configured to brake the wheels of the vehicle, or auxiliary brake systems, such as a retarder or an engine brake (in case of a hybrid vehicle). By way of example, usage of the service brakes during the braking event may, especially during extended braking events, result in increased wear and/or overheating of the service brakes. This may in turn present a safety risk.

SUMMARY

The object of the present invention is to enable a more efficient usage of regenerative braking.

The object is achieved by the subject-matter of the appended independent claim(s).

In accordance with the present disclosure, a method for controlling a vehicle is provided. The method is performed by a control device. The vehicle comprises an energy storage device capable of being charged by regenerative braking of the vehicle, a propulsion unit in the form of an electric motor powered by the energy storage device, and at least one service brake configured to brake a wheel of the vehicle. The method comprises a step of, in case it is predicted that the energy storage device will have an insufficient capacity for a desired regenerative braking power during an identified upcoming braking event, applying a braking force by activating the service brake, wherein the service brake is activated either simultaneously with application of a propulsion force by the electric motor, or in a plurality of consecutive brake phases during which a propulsion force by the electric motor is temporarily interrupted, the brake phases separated by a vehicle acceleration phase during which a propulsion force is applied by the electric motor.

By means of the present method, a more efficient usage of regenerative braking during a braking event may be achieved. This is a result of, in case it is predicted that the state of charge of the energy storage device will be too high at the initiation of the braking event to allow for a desired regenerative braking power, efficiently discharging the energy storage device prior to the braking event. Discharging of the energy storage is, by means of the present method, achieved by applying a braking force which is, at least partly, compensated for by means of the electric motor. This in turn leads to the electric motor requiring more energy compared to a case of simply continuing to drive in normal electric (or where applicable, hybrid) driving mode. This leads to an increase of the discharge of the energy storage device, meaning that the state of charge of the energy storage device, when the vehicle reaches the starting point of the braking event, will be lower compared to the case of continuing to drive in electric (or where applicable, hybrid) driving mode. Thereby, the ability to utilize regenerative braking during the braking event is improved.

The method may comprise a step of predicting whether the energy storage device will have a sufficient capacity for the desired regenerative braking power during the identified upcoming braking event based on an estimated state of charge of the energy storage device at the initiation of the upcoming braking event and an estimated charge resulting from regenerative braking during the identified upcoming braking event. Thereby, the accuracy in the prediction of whether the energy storage device will have sufficient capacity to allow the desired regenerative braking power during the upcoming braking event may be improved. This in turn further improves the control of the vehicle, and thereby the possibility to efficiently use regenerative braking during the upcoming braking event.

The step of applying a braking force by activating the service brake may be performed so as to maintain a vehicle speed within a preselected speed interval. Thereby, the energy storage device may be efficiently discharged without the risk of causing any confusion to a driver of the vehicle and/or discomfort. Furthermore, this may further contribute to the discharge of the energy storage device since the reduction in speed resulting from the application of a braking force by activation of the service brake is compensated for by the propulsion force applied by means of the electric motor.

The method may further comprise a step of predicting a desired amount of discharge of the energy storage device to be achieved prior to the point in time of initiation of the identified upcoming braking event to allow the desired regenerative braking power during the braking event. This inter alia has the advantage of enabling a more accurate determination of the amount of braking force to be applied by the service brakes, as well as when it should be applied, which in turn improves the control of the vehicle. Thereby, the risk of an unduly high usage of the service brakes may be reduced, which in turn inter alia reduces the wear of the service brakes as well as further reduces the risk for overheating of the service brakes.

The method may also comprise predicting a first point in time at which the braking force should be applied by means of the service brake, and activating the service brake at said first point in time. This in turn improves the control of the vehicle further since it enables performing the application of the braking force at an appropriate point in time to allow a desired amount of discharge of the energy storage device while not negatively affect the operation of the vehicle.

The method may further comprise predicting a second point in time at which the application of a braking force by activating the service brake should be terminated to allow a desired temperature of the service brake at the initiation of the braking event, and terminating the step of applying a braking force by activating the service brake at said second point in time, if the service brake is not already deactivated. This has the advantage of enabling a sufficient time for reduction of the temperature of the service brakes (which likely increases during the application of the braking force) such that a suitable temperature of the service brakes at the start of the braking event may be ensured. Although it may not be intended to use the service brakes during the braking event, these should still be ready for usage in case the vehicle should unexpectedly need to be braked with a higher braking power during the braking event. Furthermore, in some situations, the service brakes may need to be used during the braking event in case the available regenerative braking power is not sufficient for the whole braking event.

The method may further comprise controlling the braking force applied by means of the service brake to meet the predicted desired amount of discharge of the energy storage device to be achieved prior to the point in time of initiation of the identified upcoming braking event. Thereby, the risk of unnecessary use of the service brake may be minimized. Furthermore, the risk of discharging the energy storage device more than intended or necessary may be minimized. Moreover, this has the advantage of enabling a sufficient discharge of the energy storage device prior to the point in time of initiation of the braking event, and thus increases the possibility for efficient usage of regenerative braking during the braking event.

The method may further comprise deactivating the service brake in response to a determination that the energy storage device has reached a desired state of charge and/or that the temperature of the service brake has reached a predetermined threshold temperature. Thereby, it may be ensured that the application of a braking force by means of usage of the service brake is interrupted before the energy storage device reaches a too low state of charge or the temperature of the service brakes becomes too high. In other words, this increases the safety in the control of the vehicle and reduces the risk of permanent damage of constituent components thereof.

The method may also comprise controlling the temperature of the energy storage device for the purpose of increasing regenerative braking power available during the braking event. Thereby, the possibility to utilize regenerative braking during the braking event may be further improved.

Furthermore, the present disclosure provides a computer program comprising instructions which, when executed by a control device, cause the control device to carry out the method as described above.

The present disclosure also provides a computer-readable medium comprising instructions which, when executed by a control device, cause the control device to carry out the method as described above.

Moreover, in accordance with the present disclosure, a control device configured to control a vehicle is provided. The vehicle comprises an energy storage device capable of being charged by regenerative braking of the vehicle, a propulsion unit in the form of an electric motor powered by the energy storage device, and at least one service brake configured to brake a wheel of the vehicle. The control device is configured to, in case it is predicted that the energy storage device will have an insufficient capacity for a desired regenerative braking power during an identified upcoming braking event, either (i) apply a braking force by activating the service brake, simultaneously with applying a propulsion force by the electric motor, or (ii) apply a braking force by activating the service brake in a plurality of consecutive brake phases during which a propulsion force by the electric motor is temporarily interrupted, the brake phases separated by a vehicle acceleration phase during which a propulsion force is applied by the electric motor.

The control device has the same advantages as described above with regard to the corresponding method for controlling a vehicle.

The control device may further be configured to predict a desired amount of discharge of the energy storage device to be achieved prior to the point in time of initiation of the identified upcoming braking event to allow the desired regenerative braking power during the braking event.

Moreover, the control device may be configured to predict a first point in time at which the braking force should be applied by means of the service brake, and activate the service brake at said first point in time. Alternatively, or additionally, the control device may be configured to predict a second point in time at which the application of a braking force by activating the service brake should be terminated to allow a desired temperature of the service brake at the initiation of the braking event, and terminate the step of applying a braking force by activating the service brake at said second point in time, if the service brake is not already deactivated.

The control device may further be configured to deactivate the at least one service brake in response to a determination that the energy storage device has reached a desired state of charge and/or that the temperature of the service brake has reached a predetermined threshold temperature.

The present disclosure further provides a vehicle comprising the control device as described above. The vehicle may be a heavy vehicle, such as a bus or a truck. Moreover, the vehicle may be a hybrid vehicle or a fully electrical vehicle.

DETAILED DESCRIPTION

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

In accordance with the present disclosure, a method for controlling a vehicle is provided. More specifically, the present disclosure provides a method for controlling a vehicle approaching an upcoming braking event during which it may be desired to (during at least a portion of the braking event and/or at least partly) brake the vehicle by regenerative braking. The vehicle comprises an energy storage device capable of being charged by regenerative braking of the vehicle. The vehicle further comprises a first propulsion unit in the form of an electric motor powered by the energy storage device. The vehicle may comprise further propulsion units, for example a second electric motor and/or a combustion engine, if desired. Regenerative braking of the vehicle may be performed by operating the first propulsion unit or a possible second electric motor of the vehicle as a generator, thereby charging the energy storage device. The vehicle further comprises at least one service brake configured to brake a driven or non-driven wheel of the vehicle. Preferably, the vehicle comprises a plurality of service brakes. Any (driven or non-driven) wheel of the vehicle may be provided with a respective service brake.

The method for controlling a vehicle according to the present disclosure comprises a step of, in case it is predicted that the energy storage device will have an insufficient capacity for a desired regenerative braking power during an identified upcoming braking event, applying a braking force by activating the service brake. According to a first alternative the service brake is activated simultaneously with application of a vehicle propulsion force by the electric motor. In other words, the braking force (achieved by activation of the service brake) is applied while a propulsion force by the electric motor is applied to the vehicle. According to this first alternative, the service brake may for example be activated during a single brake phase or in a plurality of consecutive brake phases, wherein a vehicle propulsion force simultaneously is applied for the total duration of at least two consecutive brake phases (suitably substantially the whole total duration of the plurality of brake phases). According to a second alternative, the service brake is activated in a plurality of consecutive brake phases during which a vehicle propulsion force by the electric motor is temporarily interrupted, and wherein two consecutive brake phases are separated by a vehicle acceleration phase during which a vehicle propulsion force is applied by the electric motor. In other words, a plurality of vehicle brake phases are alternatingly applied with a plurality of vehicle acceleration phases.

Irrespective of which of the two alternatives for how to apply the braking force by means of the service brake is used, the present method leads to a draining of the energy storage device in view of the electric motor at least partly compensating for the braking force applied. The first alternative of how to apply the braking force has the advantage of enabling a faster discharge of the energy storage device compared to the second alternative. However, for some vehicle configurations and/or vehicle masses, the first alternative may not be suitable, in which case the second alternative is more appropriate.

As mentioned above, the method comprises a step of, in case it is predicted that the energy storage device will have an insufficient capacity for a desired regenerative braking power during an identified upcoming braking event, applying a braking force by activating the service brake. In case the vehicle comprises a plurality of service brakes (which in generally the case), the step of applying a braking force may comprise activating one or more of the service brakes. The application of a braking force may be achieved by activating at least two service brakes for reasons of vehicle stability and/or desired braking power to be achieved. The step may comprise applying a braking force by activating any combination of the service brakes, including all the service brakes.

The step of applying a braking force by activating the service brake(s) may be performed in response to the previously mentioned prediction that the energy storage device will have an insufficient capacity for a desired regenerative braking power during the identified upcoming braking event. In other words, said step may be automatically initiated if there is a prediction that the energy storage device will have an insufficient capacity for a desired regenerative braking power during the identified upcoming braking event. In such a case, the present method may be described as comprising a step of, in response to a prediction that that the energy storage device will have an insufficient capacity for a desired regenerative braking power during an identified upcoming braking event, applying a braking force by activating the service brake, wherein the service brake is activated either simultaneously with application of a propulsion force by the electric motor, or in a plurality of consecutive brake phases during which a propulsion force by the electric motor is temporarily interrupted, the brake phases separated by a vehicle acceleration phase during which a propulsion force is applied by the electric motor.

Alternatively, the step of applying a braking force by activating the service brake may, if desired, be performed in response to a driver-initiated request for draining the energy storage device prior to the upcoming braking event. In such a case, the method may comprise a step of, in response to a prediction that the energy storage device will have an insufficient capacity for a desired regenerative braking power during the identified upcoming braking event, presenting a proposal to the driver to initiate a request for draining the energy storage device prior to the upcoming braking event. The proposal may be presented to the driver in any manner previously known for presenting proposed actions to a driver of a vehicle, for example by displaying a message on a display of the vehicle and/or by sound. Said presentation of proposal to the driver may for example be performed by presenting a warning to the driver.

The method may further comprise a step of predicting whether or not the energy storage device will have a sufficient capacity for the desired regenerative braking power during the identified upcoming braking event based on an estimated state of charge of the energy storage device at the initiation of the upcoming braking event and an estimated charge resulting from regenerative braking during the identified upcoming braking event. Thereby, a reliable prediction of whether the energy storage device will have insufficient capacity for the desired regenerative braking power during the upcoming braking event, and that the energy storage device thus should be discharged prior to the braking event may be provided. Thereby, unnecessary application of a braking force by activating the service brake may be avoided.

The step of applying a braking force by activating one or more of the service brakes of the vehicle may be performed so as to maintain a vehicle speed within a preselected speed interval. The preselected speed interval may for example comprise a preselected target vehicle speed with an associated accepted margin, but is not limited thereto. Thereby, the application of a braking force may not risk causing confusion to a driver of the vehicle expecting the vehicle to travel for example at a preselected cruise speed. Furthermore, by maintaining a vehicle speed with the preselected speed interval, it may be ensured that the braking force applied by means of the one or more service brakes is efficiently compensated for by a propulsion force applied by the electric motor, such that the energy storage device is efficiently discharged.

The method may, if desired, further comprise a step of inhibiting activation (lightening) of brake lights of the vehicle when the one or more service brakes are activated. This may in particularly be performed in case the step of applying a braking force is performed so as to maintain a vehicle speed within a preselected speed interval. Normally, the brake lights of the vehicle are automatically activated when the service brakes are activated. In case the brake lights of the vehicle would be activated during the performance of the method described herein, other road users (in the vicinity of the vehicle) may become confused. For said reason, the method may comprise the step of inhibiting activation of the brake lights when the service brakes are activated for the purpose of draining the energy storage device.

The method may further comprise a step of predicting a desired amount of discharge of the energy storage device to be achieved prior to the point in time of initiation of the upcoming braking event to allow the desired regenerative braking power during the braking event. Based on such a prediction, it may be determined when to apply the brake force by activating one or more service brakes, to allow sufficient time for discharge of the energy storage device. Thus, based on this, the method may comprise predicting a first point in time at which the braking force should be applied by means of the one or more service brakes, and activating said one or more service brakes at said first point in time.

The method may further comprise a step of predicting a second point in time at which the application of a braking force by means of the one or more service brakes should be terminated to allow a desired temperature of the one or more service brakes at the initiation of the braking event. Albeit it may not be intended to use the service brakes during the braking event, but rely on regenerative braking, the service brakes should still be able to provide a sufficient braking force at any time during the braking event in case something unexpected would happen. For said reason, it may be important to ensure that the service brakes may have a suitable temperature at the initiation of the braking event, or at least shortly thereafter. Furthermore, it may in certain situations, depending on the gradient of the road and/or the duration of the braking event, to also use the service brakes during the braking event to control the vehicle speed. Also for this reason, the service brakes should have an appropriate temperature at the initiation of the braking event. The method may further comprise a step of terminating the step of applying a braking force (irrespectively of whether it is applied in a single brake phase or a plurality of consecutive brake phases) at said second point in time.

The method may also comprise a step of controlling the braking force applied by the one or more service brakes (prior to the braking event during which regenerative braking is intended) to meet the predicted desired amount of discharge of the energy storage device to be achieved prior to the point in time of initiation of the upcoming braking event. Such a control may take into account the first point in time, at which the braking force should be applied, as well as the second point in time, at which the application of a braking force should be terminated, discussed above.

The method may, primarily for safety reasons, comprise a step of, in response to a determination that the energy storage device has reached a desired state of charge and/or that the temperature of the one or more service brakes have reached a predetermined threshold temperature, deactivating the one or more service brakes. Thereby, the application of the braking force is terminated. By terminating the application of the braking force when the energy storage device has reached a desired state of charge, it may be avoided that the energy storage device is discharged below an allowable minimum state of charge threshold as well as ensuring that the energy storage device may, during the regenerative braking, obtain a suitable state of charge for the propulsion of the vehicle after the braking event has ended. The predetermined threshold temperature may for example correspond to a maximum allowable temperature of the one or more service brakes.

The method may also comprise a step of actively controlling the temperature of the energy storage device for the purpose of increasing regenerative braking power available during the braking event. Depending on the circumstances, such a control may comprise increasing, maintaining or reducing the temperature of the energy storage device. The control of the temperature of the energy storage device may be performed prior to and/or during the application of the braking force by activating the one or more service brakes. By actively controlling the temperature of the energy storage device, it may for example be possible to increase the discharge of the energy storage device prior to the braking event, thereby improving the ability to use regenerative braking during the braking event.

The performance of the method for controlling a vehicle as described herein may be governed by programmed instructions. These programmed instructions typically take the form of a computer program which, when executed in or by a control device, causes the control device to effect desired forms of control action. Such instructions may typically be stored on a computer-readable medium.

The present disclosure further relates to a control device configured to control a vehicle in accordance with the method described above. The control device may be configured to perform any one of the steps of the method for controlling a vehicle as described herein.

More specifically, a control device configured to control a vehicle is provided. Said vehicle comprises an energy storage device capable of being charged by regenerative braking of the vehicle, a propulsion unit in the form of an electric motor powered by the energy storage device, and at least one service brake configured to brake a wheel of the vehicle. The control device is configured to, in case it is predicted that the energy storage device will have an insufficient capacity for a desired regenerative braking power during an identified upcoming braking event, apply a braking force by activating the service brake. Said application of a braking force by activation may either be performed by the control device simultaneously with applying a propulsion force by the electric motor. Alternatively, said application of a braking force by activation may be performed by activating the service brake in a plurality of consecutive brake phases during which a propulsion force by the electric motor is temporarily interrupted, wherein two consecutive brake phases are separated by a vehicle acceleration phase during which a propulsion force is applied by the electric motor.

The control device may further be configured to predict whether the energy storage device will have a sufficient capacity for the desired regenerative braking power during the identified upcoming braking event. Alternatively, the control device may be configured to communicate with a control system (of the vehicle, partly comprised in the vehicle, or arranged remote from the vehicle) configured to make the predicting of whether the energy storage device will have a sufficient capacity for the desired regenerative braking power during the identified upcoming braking event.

The control device may comprise one or more control units. In case of the control device comprising a plurality of control units, each control unit may be configured to control a certain function or a certain function may be divided between more than one control units. The control device may be a part of the vehicle as such. Alternatively, parts of the control device may be arranged remotely from the vehicle, such as a remote control center or the like.

Figure 1:
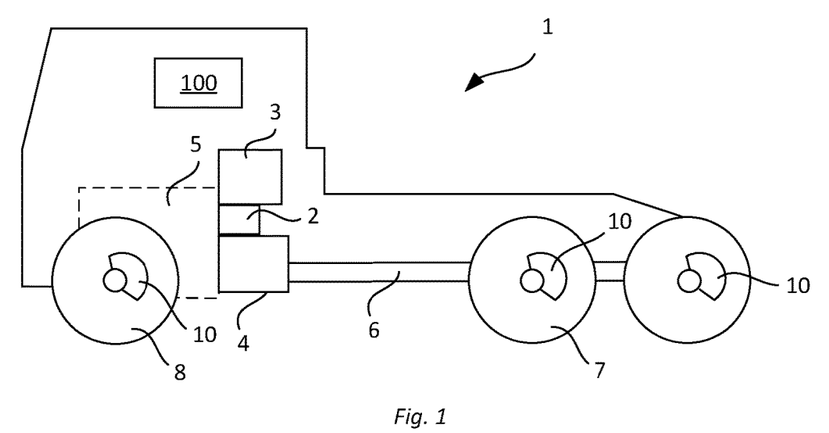
FIG. 1 schematically illustrates a side view of a vehicle.

FIG. 1 schematically illustrates a side view of an example of a vehicle 1. The vehicle may be a fully electric vehicle or a hybrid vehicle. Furthermore, the vehicle may be a heavy vehicle, such as a bus or a truck, but is not limited thereto. The vehicle 1 comprises a first propulsion unit in the form of an electric motor 2. The electric motor 2 is powered by an energy storage device 3 of the vehicle. The vehicle 1 may comprise a second propulsion unit, such as a combustion engine 5 and/or a second electric motor (not shown), if desired. The vehicle further comprises one or more service brakes 10 arranged at respective wheel of the vehicle, such as a driving wheel 7 or a non-driving wheel 8. Preferably, each wheel of the vehicle 1 may be braked by a respective service brake 10.

The vehicle 1 may further comprise a gearbox 4 configured to selectively transfer propulsion torque from the propulsion unit(s) to the driving wheels 7 of the vehicle. The gearbox 4 may be connected to the driving wheels 7 of the vehicle via conventional propeller shaft 6. In such a case, the vehicle powertrain may have a central drive configuration. It should however be noted that the vehicle powertrain may alternatively have an electric axle configuration, if desired.

In addition to being configured to power the electric motor 2, the energy storage device 3 is configured to be charged by regenerative braking of the vehicle 1. This may for example be achieved by operating the electric motor 2 as a generator. Alternatively, the energy storage device 3 may be charged by operating a second electric motor, if present, as a generator during regenerative braking of the vehicle.

The vehicle 1 may further comprise a control device 100 configured to control the vehicle. In particular, the control device 100 may be configured to control the electric motor, the energy storage device and the service brakes. The control device 100 may also be configured to communicate with a remote control center, control devices of other vehicles, and/or control units of the infrastructure, via any previously known communication system therefore, such as a V2X communication system, for the purpose of exchanging various forms of data. Examples of such data may comprise data for positioning of the vehicle and/or map data (including topographic data), but is not limited thereto.

Figure 2:
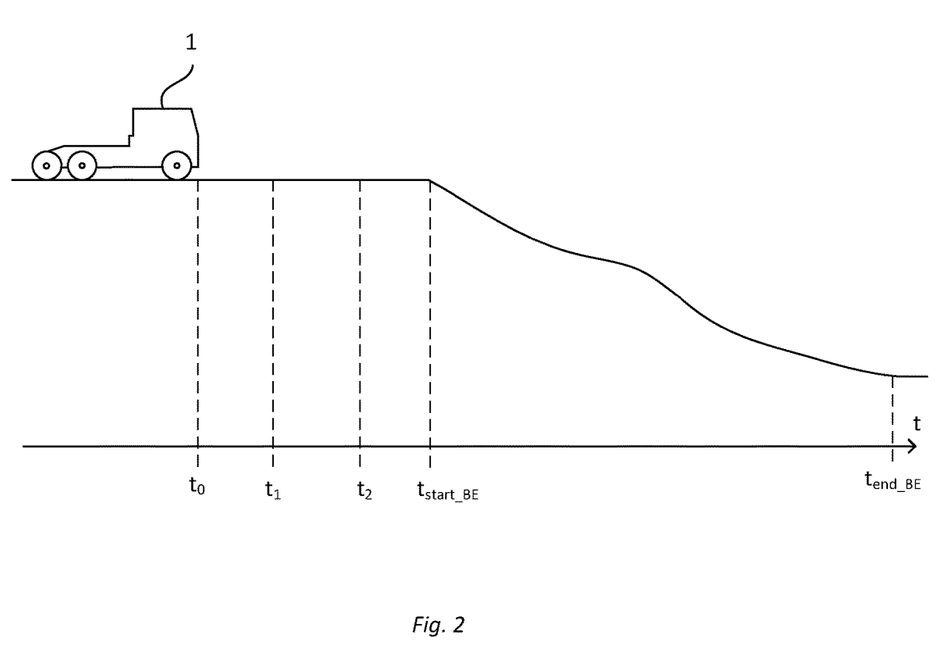
FIG. 2 schematically illustrates a situation of a vehicle approaching a downhill stretch of a road and a braking event associated with the downhill stretch is identified.

For the purpose of illustrating one possible situation and certain features of the method according to the present disclosure, FIG. 2 schematically illustrates a vehicle, such as the vehicle 1 shown in FIG. 1, when approaching a downhill stretch of a road. At the point in time $t_0$, an upcoming braking event may be identified, and it may be determined that the braking event is expected to start at a time $t_{start\_BE}$. The braking event may for example be during the downhill stretch, but may also start before the vehicle actually reaches the downhill stretch or after the vehicle has passed the start of the downhill stretch. The upcoming braking event may further be expected to end at the point in time $t_{end\_BE}$. When the upcoming braking event has been identified, it may be predicted whether the energy storage device, at $t_{start\_BE}$, will have a sufficient capacity for a desired regenerative braking power during an identified upcoming braking event. The desired regenerative braking power may for example be a regenerative braking power in order to maintain a vehicle speed within a predetermined speed interval during the braking event. Such a vehicle speed could be the substantially the same, higher or lower than the vehicle speed prior to the braking event. Alternatively, or additionally, the desired regenerative braking power may be a sufficient regenerative braking power such that usage of further brake systems of the vehicle, such as auxiliary brake systems and/or the service brakes may be avoided during the braking event or at least a portion thereof.

In case it is predicted that the energy storage device will have an insufficient capacity for the desired regenerative braking power, i.e. if the state of charge of the energy storage device will be too high at $t_{start\_BE}$ to allow the desired regenerative braking power, the method comprises applying a braking force by activating the service brakes at a first point in time, $t_1$. The application of the braking force by activating the service brakes may be terminated at a second point in time, $t_2$. The application of the braking force is initiated and terminated before the vehicle reaches the braking event. In other words, both $t_1$ and $t_2$ is prior to the start of the braking event, i.e. $t_{start\_BE}$. Moreover, the application of the braking force by activating the service brake is performed either simultaneously with application of a vehicle propulsion force by the electric motor, or in a plurality of consecutive brake phases during which a propulsion force by the electric motor is temporarily interrupted, the brake phases separated by a vehicle acceleration phase during which a propulsion force is applied by the electric motor. Thereby, the energy storage device is efficiently discharged prior to the vehicle reaching the braking event since the (by means of the service brake(s)) applied braking force is compensated by a propulsion force applied by the electric motor powered by the energy storage device.

Figure 3:
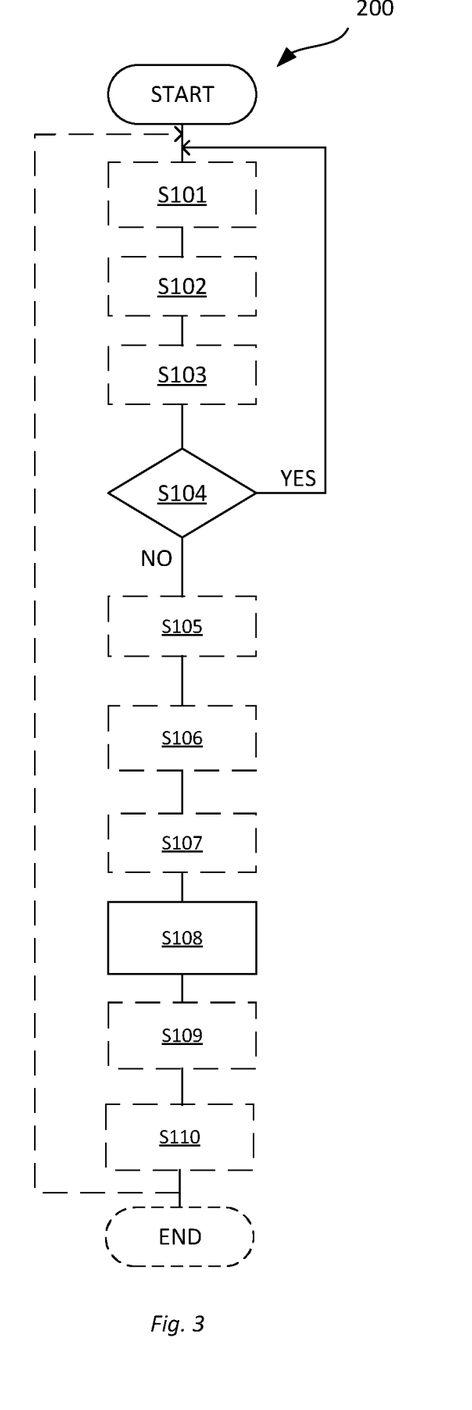
FIG. 3 represents a flowchart schematically illustrating a first exemplifying embodiment of the method for controlling a vehicle according to the present disclosure.

FIG. 3 represents a flowchart schematically illustrating a first exemplifying embodiment 200 of the method for controlling a vehicle in accordance with the present disclosure. In the flowchart, optional steps are illustrated by dashed lines and/or boxes. The method may comprise any one of the optional steps independently of other optional steps, as well as any combination of a plurality of optional steps. As previously mentioned, the vehicle comprises an energy storage device capable of being charged by regenerative braking of the vehicle, a propulsion unit in the form of an electric motor powered by the energy storage device, and at least one service brake configured to brake a wheel of the vehicle. In case the vehicle comprises a plurality of service brakes, each service brake may be associated with a respective (driven or non-driven) wheel of the vehicle.

The method 200 may comprise a step S101 of identifying an upcoming braking event. Such an identification may be made by any previously known method therefore, such as by usage of knowledge of the geographical position of the vehicle in combination with map data and/or by usage of a look-ahead system.

The method may further comprise a step S102 of estimating the state of charge of the energy storage device at start of an identified upcoming braking event. In other words, the method may comprise a step S102 of estimating the (future) state of charge of the energy storage device at the point in time at which regenerative braking is estimated to be initiated for the braking event. Such an estimation may be made by determining the current state of charge of the energy storage device, and estimating the change in state of charge of the energy storage device from the current state of charge up to the point in time of start of the braking event. The change in state of charge is dependent of the operation of the vehicle up to the point in time of start of the braking event. Therefore, the operational condition of the vehicle may be taken into consideration in the estimation of the change of state of charge of the energy storage device. Moreover, other factors, such as vehicle mass etc., may be taken into account when estimating the change in state of charge.

The method may further comprise a step S103 of estimating the charge which would result from regenerative braking during the upcoming braking event. The estimation of the charge which would result from regenerative braking during the braking event may take into account factors such as vehicle speed (which may be essentially the same or varying during the braking event), topography, duration of braking event, braking power (which may be essentially constant or varying during the braking event), vehicle mass etc. Furthermore, said estimation may also take into account the possible usage of auxiliary brakes, if available, and the braking power achieved thereby.

The method 200 may typically comprise a step S104 of predicting whether the energy storage device will have sufficient capacity for a desired regenerative braking power during an identified upcoming braking event. A desired regenerative braking power may for example correspond to a regenerative braking power needed for maintaining a vehicle speed within a preselected speed interval. This may for example be defined by a cruise control system, a downhill speed control system, or the like. Said prediction in step S104 may be based on the estimated state of charge at the initiation of the braking event as obtained in step S102 and the estimated charge resulting from regenerative braking during the identified upcoming braking event as obtained in S103. In case it is predicted that the energy storage device will have sufficient capacity for the desired regenerative braking power during the identified upcoming braking event, the method may be returned to start. However, in case it is predicted that the energy storage device will have insufficient capacity for a desired regenerative braking power during the identified upcoming braking event, the method proceeds to subsequent steps.

The method 200 comprises a step S108 of, in case it is predicted that the energy storage device will have an insufficient capacity for a desired regenerative braking power during an identified upcoming braking event, applying a braking force by activating one or more service brakes of the vehicle. The step S108 may be performed automatically in response to the prediction that the energy storage device will have insufficient capacity for the desired regenerative braking power during the identified upcoming braking event. The application of a braking force in step S108 is, according to one alternative, performed in a single brake phase during which also a vehicle propulsion force is applied by means of the electric motor (compare with FIG. 5a). According to another alternative, the application of a braking force in step S108 is performed by activating the service brake(s) in a plurality of consecutive brake phases, wherein a propulsion force simultaneously is applied for the total duration of at least two consecutive brake phases (compare with FIG. 5b). According to yet an alternative, the application of a braking force in step S108 is performed by activating the service brake(s) in a plurality of consecutive brake phases during which a propulsion force by the electric motor is temporarily interrupted, the consecutive brake phases being separated by a vehicle acceleration phase during which a propulsion force is applied by the electric motor (compare with FIG. 5c).

Prior to the step S108, the method 200 may also comprise a step S105 of predicting the desired amount of discharge to be achieved prior to the point in time of initiation of the identified upcoming braking event to allow the desired regenerative braking power during the braking event. This may be performed simultaneously with step S104.

The method 200 may further comprise a step S106 of predicting a first point in time at which a braking force should be applied by means of the one or more service brakes. In other words, in step S106, it may be predicted when to initiate step S108.

The method 200 may further comprise a step S107 of predicting a second point in time at which the application of a braking force by activating the service brake(s) should be terminated to allow a desired temperature of the service brake at the initiation of the braking event. The reason therefore is allow sufficient time for the service brake(s) to cool down to a suitable temperature to allow usage of the service brake(s) during the upcoming braking event, if necessary. In other words, in step S107, it may be predicted when to terminate step S108.

The method 200 may, when step S108 has been initiated, further comprise a step S109 of controlling the braking force applied by means of the service brake(s) to meet the predicted desired amount of discharge of the energy storage device to be achieved prior to the point in time of initiation of the identified upcoming braking event (as obtained in step S105).

The method 200 may further comprise, after the initiation of step S108, a step S110 of deactivating the one or more service brakes in response to a determination that the energy storage device has reached a desired state of charge and/or that the temperature of the service brake has reached a predetermined threshold temperature. In other words, the method may comprise a step of terminating the application of a braking force by means of the service brake(s) in case there is no longer a desired to discharge the energy storage device (it reaches a minimum threshold state of charge or has sufficient capacity for the regenerative braking event) and/or the service brake(s) has/have reached an undesirably high temperature. Step S108 may thus be regarded as a safety step.

After step S108 and/or any one of the optional steps S109 and S110, the method may be terminated. Alternatively, the method may be reverted back to start.

Figure 4:
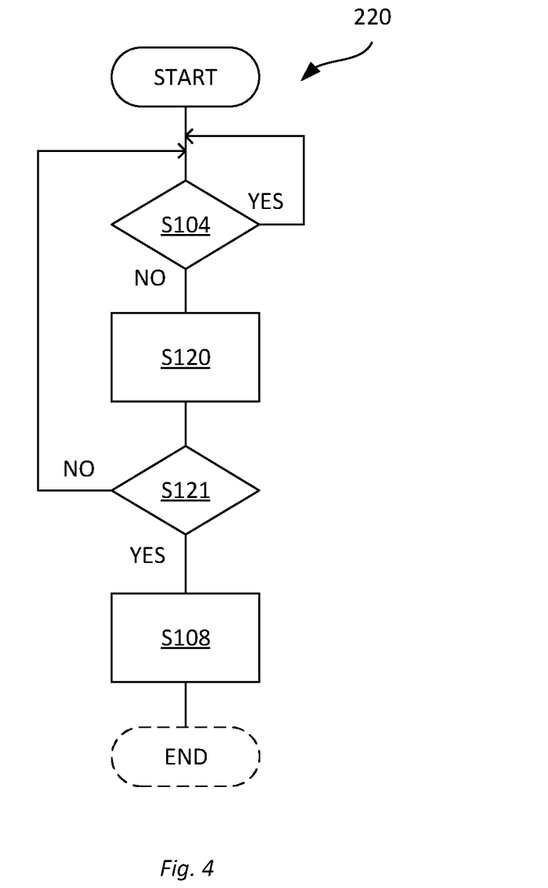
FIG. 4 represents a flowchart schematically illustrating a second exemplifying embodiment of the method for controlling a vehicle according to the present disclosure, FIGS. 5a-5c schematically illustrates different alternatives for applying a braking force by activation of one or more service brakes in accordance with the method of the present disclosure, FIG. 6 schematically illustrates a device that may constitute, comprise or be a part of a control device in accordance with the present disclosure, said control device configured to control a vehicle.

FIG. 4 represents a flowchart schematically illustrating a second exemplifying embodiment 220 of the method for controlling a vehicle in accordance with the present disclosure. The method 220 may comprise a step S104 of predicting whether the energy storage device will have sufficient capacity for a desired regenerative braking power during an identified upcoming braking event. In case it is predicted that the energy storage device will have sufficient capacity for the desired regenerative braking power during the identified upcoming braking event, the method may be returned to start. However, in case it (in step S104) is predicted that the energy storage device will have an insufficient capacity for a desired regenerative braking power during the identified upcoming braking event, the method proceeds to step S120. Step S120 comprises presenting a proposal to a driver of the vehicle to initiate a request for draining of the energy storage device prior to the identified upcoming braking event. The presentation of the proposal may be performed by using any previously known means for presenting a proposed action to a driver of a vehicle, such as visually (via for example a display) and/or by sound.

After step S120, the method comprises a step S121 of determining whether a driver has requested draining of the energy storage device. In case it is determined that the driver has not requested draining of the energy storage device, the method 220 may revert to start. However, in case it is determined that the driver has requested draining of the energy storage device, the method may proceed to step S108 wherein a braking force is applied by activation of the service brakes. As described above with regard to the exemplifying embodiment shown in FIG. 3, the application of a braking force in step S108 may, according to one alternative, be performed in a single brake phase during which also a vehicle propulsion force is applied by means of the electric motor (compare with FIG. 5a). According to another alternative, the application of a braking force in step S108 is performed by activating the service brake(s) in a plurality of consecutive brake phases, wherein a propulsion force simultaneously is applied for the total duration of at least two consecutive brake phases (compare with FIG. 5b). According to yet an alternative, the application of a braking force in step S108 is performed by activating the service brake(s) in a plurality of consecutive brake phases during which a propulsion force by the electric motor is temporarily interrupted, the consecutive brake phases being separated by a vehicle acceleration phase during which a propulsion force is applied by the electric motor (compare with FIG. 5c).

Albeit not illustrated in FIG. 4, the method may further comprise any one of the steps S101-S103, S105-S107 and S109 as described above with reference to FIG. 3, if desired.

Figure 5A:
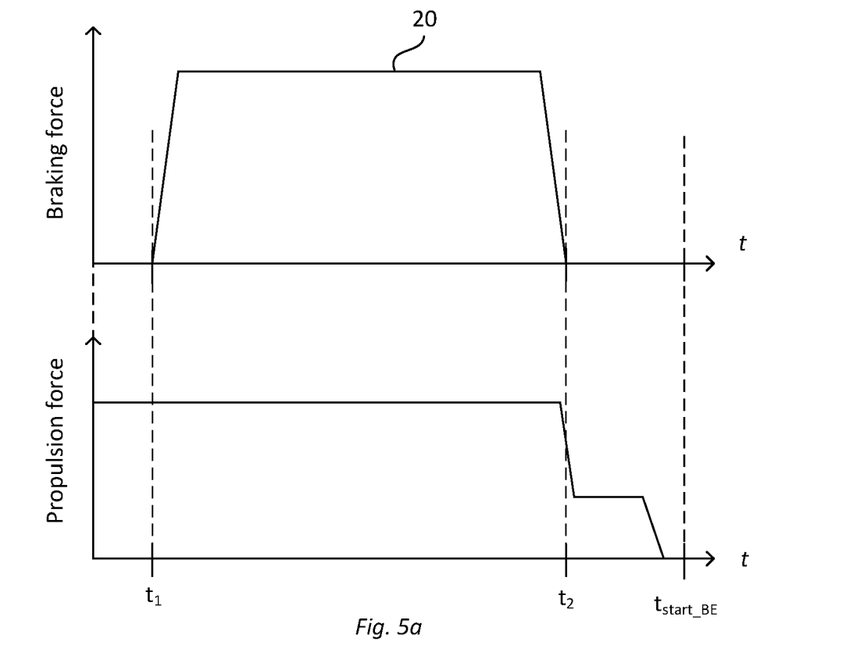
Figure 5B:
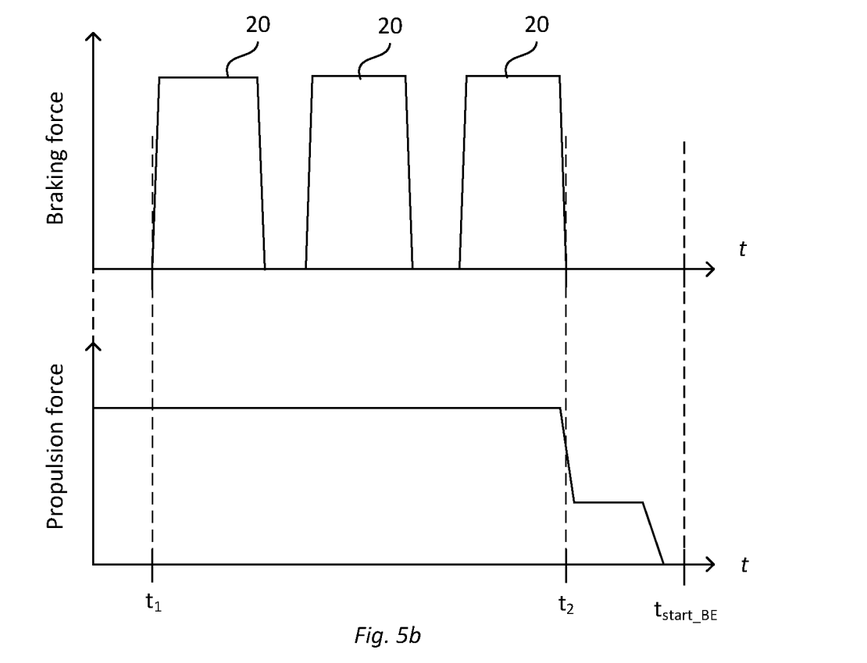
Figure 5C:
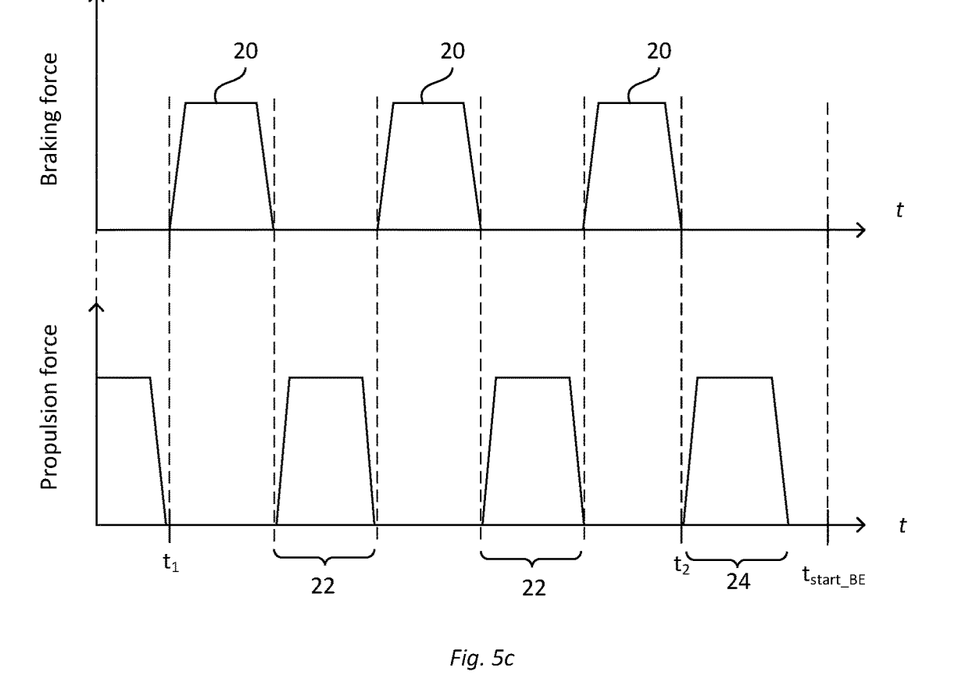

As previously discussed, the present method comprises applying a braking force by activating one or more of the service brakes of the vehicle in case of a prediction of insufficient capacity for a desired regenerative braking power during an identified upcoming braking event. The purpose of applying such a braking force is to increase the load on the electric motor such that it will result in an increased discharge of the energy storage device. In other words, the increased load on the electric motor is a result of the braking force applied by activation of one or more of the service brakes of the vehicle being intended to be compensated by the electric motor. This application of the braking force, and the therewith associated application of a propulsion force, is performed prior to the initiation of the upcoming braking event. FIGS. 5a-5c schematically illustrates different alternatives of how such a braking force may be applied by activating the one or more service brakes in accordance with the present method.

FIG. 5a schematically illustrates the braking force as applied by the one or more service brakes (upper portion), as well as the vehicle propulsion force as applied by the electric motor (lower portion), over time. According to this alternative, the braking force is applied simultaneously with the application of a propulsion force by the electric motor. The application of the braking force, by means of the one or more service braked, may be performed during a single brake phase initiated at a first point in time, $t_1$. At a second point in time, $t_2$, the application of the brake force is terminated. The second point in time $t_2$ is prior to the point in time at which the braking event is estimated to be started, $t_{start\_BE}$ (compare also with FIG. 2). The fact that the application of a brake force by means of the one or more service brakes is terminated prior to the initiation of the upcoming braking event allows for a reduction of the temperature of the service brakes prior to the initiation of the upcoming braking event. Thereby, an increase in the temperature of the service brake(s) resulting from the brake phase does not risk causing a safety issue caused by the service brake(s) having a too high temperature during the braking event. As also shown in FIG. 5a, a vehicle propulsion force is applied by the electric motor during the whole brake phase. The application of the vehicle propulsion force may, if desired be terminated after $t_2$. Thus, a application of vehicle propulsion force by the electrical motor, which causes a discharge of the energy storage device (albeit lower than during the above described braking phase), may be continued during the time up to $t_{start\_BE}$. However, the applied vehicle propulsion force between $t_2$ and $t_{start\_BE}$ may preferably be lower than during the brake phase in order to avoid an increase in the vehicle speed just prior to the initiation of the braking event. Alternatively, the application of a propulsion force by the electric motor may be terminated essentially simultaneously with the termination of the brake phase, or just prior to the termination of the brake phase.

FIG. 5b schematically illustrates another alternative of how to apply a braking force by activation of one or more service brakes of the vehicle, simultaneously with the application of a vehicle propulsion force by the electric motor. The alternative illustrated in FIG. 5b is similar to the alternative illustrated in FIG. 5a, but differs in the one or more service brakes are activated in a plurality of consecutive brake pulses 20 (three shown in the figure). The plurality of brake pulses are initiated at $t_1$ and terminated at $t_2$, which may be prior to $t_{start\_BE}$.

FIG. 5c schematically illustrates another alternative of how to apply a braking force by activation of one or more service brakes of the vehicle. Similarly to the alternative illustrated in FIG. 5b, the one or more service brakes are activated in a number of consecutive brake phases 20 and the total duration of the brake phases ranges from $t_1$ to $t_2$. However, in contrast to the alternative illustrated in FIG. 5b, no vehicle propulsion force is applied by the electric motor during the respective brake phases. Instead, the brake phases 20 are separated by a vehicle acceleration phase 22. During such a vehicle acceleration phase, a propulsion force is applied by the electric motor. During the vehicle acceleration phase, a reduction in vehicle speed resulting from the application of a preceding brake phase may be compensated for during the vehicle acceleration phase. As shown in FIG. 5c, a final vehicle acceleration phase 24 may be performed after $t_2$, but prior to $t_{start\_BE}$. However, the final vehicle acceleration phase 24 may be omitted, or be performed with a lower propulsion force applied compared to previous vehicle acceleration phases 22, if desired. The combination of a plurality of brake phases separated by vehicle acceleration phases, as shown in FIG. 5c, results in a higher discharge of the energy storage device compared to a case if only a propulsion force (i.e. no braking force) would be applied for the same average vehicle speed assuming the travelling route for the vehicle.

Figure 6:
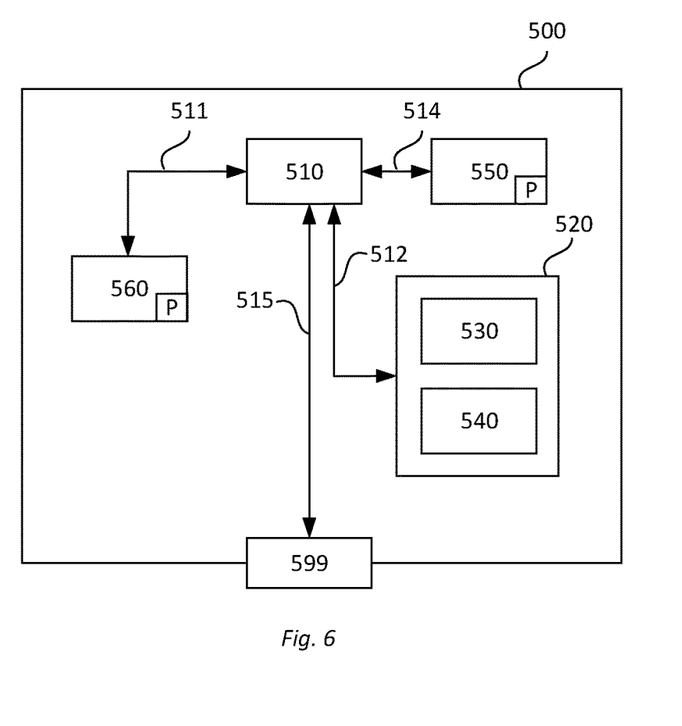

FIG. 6 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions for controlling a vehicle, said vehicle comprising an energy storage device, an electric motor powered by the energy storage device and at least one service brake configured to brake a wheel of the vehicle. The computer program comprises instructions for, in case it is predicted that the energy storage device will have an insufficient capacity for a desired regenerative braking power during an identified upcoming braking event, applying a braking force by activating the service brake. The computer program may comprise instructions for performing said application of a braking force simultaneously with the application of a vehicle propulsion force by the electric motor. Alternatively, the computer program may comprise instructions for applying said braking force by activating the service brake in a plurality of consecutive brake phases during which a propulsion force by the electric motor is temporarily interrupted, the brake phases separated by a vehicle acceleration phase during which a propulsion force is applied by the electric motor.

The program P may be stored in an executable form or in a compressed form in a memory 560 and/or in a read/write memory 550.

The data processing unit 510 may perform one or more functions, i.e. the data processing unit 510 may affect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be affected by the device 500 by means of the data processing unit 510 which runs the program stored in the memory 560 or the read/write memory 550. When the device 500 runs the program, methods herein described are executed.

The invention claimed is:

1. A method, performed by a control device, for controlling a vehicle,
   the vehicle comprising:
   an energy storage device capable of being charged by regenerative braking of the vehicle,
   a propulsion unit in the form of an electric motor powered by the energy storage device, and
   at least one service brake configured to brake a wheel of the vehicle;
   the method comprising:
   in case it is predicted that the energy storage device will have an insufficient capacity for a desired regenerative braking power during an identified upcoming braking event;
   predicting a desired amount of discharge of the energy storage device to be achieved prior to a point in time of initiation (tstart BE) of the identified upcoming braking event to allow the desired regenerative braking power during the identified upcoming braking event, and
   applying a braking force by activating the service brake,
   wherein the service brake is activated either simultaneously with application of a propulsion force by the electric motor, or in a plurality of consecutive brake phases during which a propulsion force by the electric motor is temporarily interrupted, the brake phases separated by a vehicle acceleration phase during which a propulsion force is applied by the electric motor.

2. The method according to claim 1, further comprising: predicting whether the energy storage device will have a sufficient capacity for the desired regenerative braking power during the identified upcoming braking event based on an estimated state of charge of the energy storage device at the initiation ($t_{start\_BE}$) of the identified upcoming braking event and an estimated charge resulting from regenerative braking during the identified upcoming braking event.

3. The method according to claim 1, wherein the step of applying the braking force by activating the service brake is performed so as to maintain a vehicle speed within a preselected speed interval.

4. The method according to claim 1, further comprising: predicting a first point in time ($t_1$) at which the braking force should be applied by means of the service brake, and
activating the service brake at said first point in time ($t_1$).

5. The method according to claim 1, further comprising: predicting a second point in time ($t_2$) at which the application of the braking force by activating the service brake should be terminated to allow a desired temperature of the service brake at the initiation ($t_{start\_BE}$) of the identified upcoming braking event, and terminating the step of applying the braking force by activating the service brake at said second point in time ($t_2$), if the service brake is not already deactivated.

6. The method according to claim 1, further comprising controlling the braking force applied by means of the service brake to meet the predicted desired amount of discharge of the energy storage device to be achieved prior to the point in time of initiation ($t_{start\_BE}$) of the identified upcoming braking event.

7. The method according to claim 1, further comprising deactivating the service brake in response to a determination that the energy storage device has reached a desired state of charge and/or that a temperature of the service brake has reached a predetermined threshold temperature.

8. The method according to claim 1, further comprising controlling a temperature of the energy storage device for the purpose of increasing regenerative braking power available during the identified upcoming braking event.

9. A computer-readable medium comprising instructions which, when executed by a control device, cause the control device to carry out the method according to claim 1.

10. A control device configured to control a vehicle, the vehicle comprising:
   an energy storage device capable of being charged by regenerative braking of the vehicle,
   a propulsion unit in the form of an electric motor powered by the energy storage device, and
   at least one service brake configured to brake a wheel of the vehicle;
   wherein the control device is configured to:
      in case it is predicted that the energy storage device will have an insufficient capacity for a desired regenerative braking power during an identified upcoming braking event:
         predict a desired amount of discharge of the energy storage device to be achieved prior to a point in time of initiation ($t_{start\_BE}$) of the identified upcoming braking event to allow the desired regenerative braking power during the identified upcoming braking event, and
         either (i) apply a braking force by activating the service brake, simultaneously with applying a propulsion force by the electric motor, or (ii) apply a braking force by activating the service brake in a plurality of consecutive brake phases during which a propulsion force by the electric motor is temporarily interrupted, the brake phases separated by a vehicle acceleration phase during which a propulsion force is applied by the electric motor.

11. The control device according to claim 10, further configured to:
   predict a first point in time ($t_1$) at which the braking force should be applied by means of the service brake, and activate the service brake at said first point in time ($t_1$); and/or
   predict a second point in time ($t_2$) at which the application of the braking force by activating the service brake should be terminated to allow a desired temperature of the service brake at the initiation ($t_{start\_BE}$) of the identified upcoming braking event, and terminate the step of applying the braking force by activating the service brake at said second point in time ($t_2$), if the service brake is not already deactivated.

12. The control device according to claim 10, further configured to deactivate the service brake in response to a determination that the energy storage device has reached a desired state of charge and/or that a temperature of the service brake has reached a predetermined threshold temperature.

* * * * *